US008714081B2

(12) United States Patent
Patrikios et al.

(10) Patent No.: US 8,714,081 B2
(45) Date of Patent: May 6, 2014

(54) PRESS FOR ULTRASONIC WELDING DEVICE

(75) Inventors: Mike Patrikios, Milford, CT (US); Andrew Rushton, New Milford, CT (US)

(73) Assignee: Sonics & Materials Inc, Newtown, CT (US)

(*) Notice: Subject to any disclaimer, the term of this patent is extended or adjusted under 35 U.S.C. 154(b) by 805 days.

(21) Appl. No.: 12/490,801

(22) Filed: Jun. 24, 2009

(65) Prior Publication Data

US 2010/0005981 A1 Jan. 14, 2010

Related U.S. Application Data

(60) Provisional application No. 61/078,829, filed on Jul. 8, 2008.

(51) Int. Cl.
*F16P 3/00* (2006.01)

(52) U.S. Cl.
CPC .................................. *F16P 3/00* (2013.01)
USPC ..................................... 100/347; 100/269.01

(58) Field of Classification Search
CPC ..................................... F16P 1/00; F16P 3/00
USPC .......... 100/347, 269.01, 270, 269.05, 269.06, 100/269.07, 269.08, 269.12, 269.14, 269.1; 72/446
See application file for complete search history.

(56) References Cited

U.S. PATENT DOCUMENTS

| | | | |
|---|---|---|---|
| 3,563,443 A | 2/1971 | Pedrotti | |
| 3,775,582 A | 11/1973 | Iceland | |
| 3,813,021 A | 5/1974 | Kramer | |
| 4,048,004 A | 9/1977 | Watkins | |
| 4,326,155 A | 4/1982 | Griebeler | |
| 5,303,641 A * | 4/1994 | Gallandere | 100/35 |
| 5,307,572 A * | 5/1994 | Engel | 38/43 |
| 6,070,777 A | 6/2000 | Patrikios et al. | |
| 6,279,370 B1 * | 8/2001 | Awad | 72/453.02 |
| 6,418,824 B1 | 7/2002 | Duggins et al. | |
| 6,925,916 B2 | 8/2005 | Duggins et al. | |
| 6,964,364 B2 | 11/2005 | Parada | |
| 7,325,437 B2 * | 2/2008 | Boatright et al. | 72/407 |
| 2007/0068991 A1 | 3/2007 | Handel et al. | |
| 2007/0257087 A1 | 11/2007 | Klinstein et al. | |

* cited by examiner

*Primary Examiner* — Jimmy T Nguyen
(74) *Attorney, Agent, or Firm* — St. Onge Steward Johnston & Reens LLC

(57) ABSTRACT

A safety device for a press having a head for applying force, a single fixed pressure source for actuating a low force pressure driven actuator and a high force pressure driven actuator for the head, wherein the operation of the head is limited to only with the low force actuator until the head is in a safe position, when the head is determined to be in a safe position the high force actuator's use is permitted.

26 Claims, 4 Drawing Sheets

PRESS FOR ULTRASONIC WELDING DEVICE

CROSS-REFERENCE TO RELATED APPLICATIONS

This patent application claims the benefit of, under Title 35, United States Code, Section 119(e), U.S. Provisional Patent Application No. 61/078,829, filed Jul. 8, 2008.

FIELD OF THE INVENTION

This invention generally relates to a safety device for presses, and more particularly to those used in ultrasonic welding, staking and inserting machines; vibration welding, staking and inserting machines; and hot plate welding, staking and inserting machines. More specifically, this invention relates to a safety device which limits the amount of force exerted by the press until the head has been determined to be in a safe position.

BACKGROUND OF THE INVENTION

It is common in various areas of manufacture, such as in the case of punches; and hotplate, ultrasonic or vibration welding, staking, inserting and the like, to provide a head that is caused by a press to move, for example up and down, with respect to a workpiece upon which work is to be performed. It is also common for the press, via the head and typically a tool, to exert a great amount of force upon the workpiece, and for it to be necessary for a human operator to be required to manually adjust the position of the workpiece with respect to the head as the head approaches the workpiece in order to achieve proper working alignment.

More specifically, ultrasonic welding is a process whereby ultrasonic acoustic vibrations are locally applied to work pieces being held together under pressure to create a solid-state weld. During this process the work pieces to be welded together are held under pressure between a fixed anvil and a horn which emits the acoustic vibrations. The pressure generated between the anvil and the horn during the welding process can be quite great. A problem exists, however, in that it is often necessary for an operator to be required to manually position the parts for welding, and if the operator's hand, or more typically one or more of his/her fingers, is caught between the head or anvil and the work piece, the large force exerted by the press can cause severe and permanent damage to the operator.

A number of safety devices, such as guards, sensors and the like, have been developed to reduce the occurrence of operator injury. However, all known safety devices have problems of their own, such as interfering with the operator's manipulation of the workpiece, requiring expensive add-ons to the press and being subject to tampering and/or removal.

One such safety device is disclosed in U.S. Pat. No. 6,418,824, which is a hydraulic press that utilizes a single actuator and is powered by a first low pressure source, to move the press safely to a predetermined position without generating enough force to seriously injure or damage any obstructions. Once the piston has reached its predetermined position, a second high pressure source is supplied to the actuator to complete the cycle. However, this system requires the machine to have two separate pressure sources, which adds a great deal of cost and inefficiency to the process. Furthermore, there are risks of these pressure sources being improperly adjusted or possibly switched, which could result in harm to the operator.

What is desired, therefore, is a press which provides the safety advantage of a low force and high force mode but only uses a single fixed pressure source.

SUMMARY OF THE INVENTION

Accordingly, it is an object of the present invention to provide a press that utilizes a single pressure source yet provides the advantage of a low force safety mode, for positioning a workpiece with respect to the press, and a high force use mode, which is only activated when it is determined that the head of the unit is a safe distance from the part. A safe distance is that which is small enough where an operator's finger or hand would not fit between the head and the part.

One aspect of the invention involves selecting the proper sized low force and high force actuators to supply the desired force for each mode. For instance, if pressure cylinders are used one can either reference a force chart from the cylinders supplier or it can be calculated. The Force ("F") exerted by the cylinder can roughly be calculated to equal the Area ("A") of the piston multiplied by the pressure ("p") used (F=p*A). Where A equals $\pi$ multiplied by the diameter ("d") of the piston squared, divided by 4 ($A=\pi*d^2/4$).

Therefore, if one wanted to operate a press at a pressure of 100 psi, with the desired low force of 10 lbs and the desired high force of 100 pounds, the low force cylinder would have an $A=0.1$ in$^2$ and approximately a $d=0.36$ in., while the high force cylinder would have an $A=1$ in$^2$ and approximately a $d=1.13$ in. Thus, one would fit the press with cylinders within these specifications.

Still another aspect of the invention could be to have a press set up at a specified high to low force ratio of x:1. For example, if one were to have a machine set up as outline above, the force ratio would be 100:10 or a 10:1 ratio. Setting up a machine at such a ratio can allow an operator to know what range of pressure at which one could safely operate that specific machine. For instance if one was to determine that on the press outlined above the minimum operating pressure at which independently both cylinders could efficiently actuated the head of the machine was 25 psi, this would translate into a minimum low force of 2.5 pounds, and a minimum high force of 25 pounds. Now to calculate the high end of the operating range of the machine one would need to determine at what maximum force the head can be actuated without causing severe injuries. If it was determined that the maximum force the head could exert onto someone without causing severe injuries was 22 pounds this would translate into a maximum operating pressure of 220 psi. This is also assuming that the cylinders operating pressure is also in this range. Therefore, the safe operating range of this particular device with these cylinders would be between 25 and 220 psi. The advantage of having an x:1 ratio is a known safe operating range. Therefore, if a different operating pressure was used, due to the need for more force on the application, fluctuations of the existing supply, or any other reason, one would know whether the device was still in a safe operating range.

Still another aspect of the invention involves selecting the proper means for determining when the head is in safe proximity to the part or anvil. This can be achieved, for example, by the use of one or more sensors or switches on the horn or actuator.

Other aspects, features and advantages according to the present invention will become apparent from the following detailed description of certain advantageous embodiments when read in conjunction with the accompanying drawings in which the same components are identified by the same reference numerals.

DETAILED DESCRIPTION OF THE INVENTION

Figure 1:
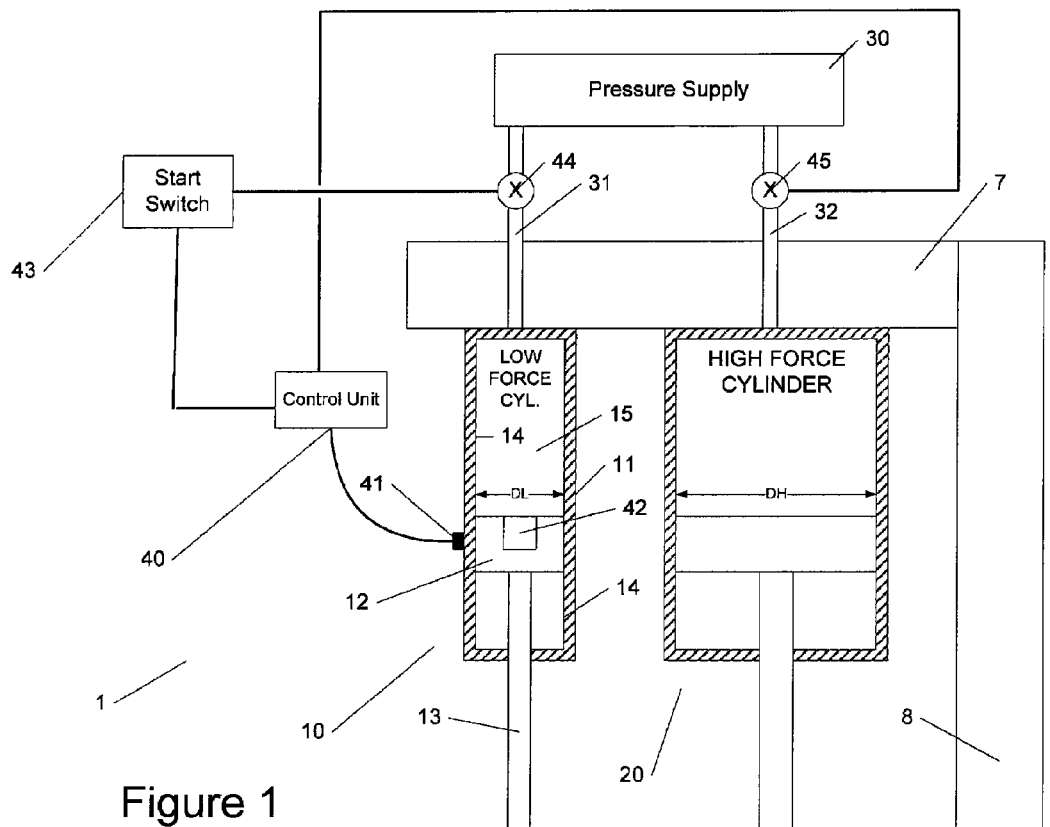
FIG. 1 is a schematic view of one embodiment of the present invention, which incorporates low and high force actuators, as well as a sensor for determining when it is safe to allow the high force actuator to function.
Figure 1:
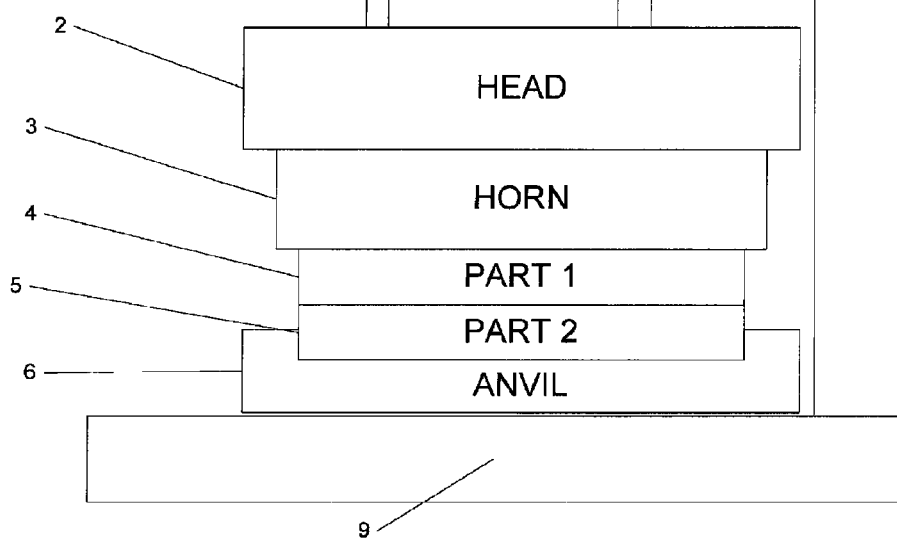

The invention as shown in FIG. 1 is a simplified view of an ultrasonic welding machine 1, which incorporates a low force cylinder 10, a high force cylinder 20, and a control unit 40 used to determine when the head 2 of the press is in a safe position by means of a sensor 41.

The basic press as shown has a frame which includes a base 9, a rear support 8 and an upper arm 7. Attached to the upper arm 7 are the low force cylinder 10 and high force cylinder 20. Each cylinder comprises a housing 11 with an internal cylindrical bore 14. A piston 12 is encased within the cylinder and is tightly sealed against the cylindrical bore 14. The piston 12 along with the cylindrical bore 14 create a pressure chamber 15. Attached to the bottom of the piston 12 is a drive rod 13, the lower end of which is connected to the head 2. The drive rod transmits the force generated by the cylinder to the head 2, attached to which is the horn 3. During operation the parts to be welded together 4, 5 are pressed between the horn 3 and the anvil 6 attached to the base.

Pressure from the pressure supply 30 is transmitted to the low force cylinder 10 via pipe 31 and to the high force cylinder 20 via a pipe 32. The pipe for each cylinder also has an inline valve 44 for the low force cylinder 10 and an inline valve 45 for the high force cylinder 20. These valves are used to regulate when pressure is supplied to their respective cylinder.

The press further comprises a control unit 40, which regulates when pressure from the pressure supply 30 is transmitted to the low force cylinder 10, the high force cylinder 20, or both. The control unit 40 determines the position of the head 2 and/or horn 3, via a sensor 41. In this particular embodiment, the sensor 41 is a magnetic proximity sensor located on the low force cylinder 10. The piston 12 of the low force cylinder 10 has a magnet 42, fixed into a center bore of the piston 12. It should be noted that this is just one embodiment of the present invention and the sensor can be any type of sensor, including a switch, and the placement of the sensor can be anywhere on the press where it can determine the position of the head 2 and/or horn 3.

The press also has a start switch 43 which can be directly connected to the valve 44 for the low force cylinder 10, to the control unit 40, or both. If the start switch 43 is only connected to the control unit 40 then it would be necessary for the control unit 40 to be connected to both the low force cylinder valve 44 and the high force cylinder valve 45. These are only a few ways in which the unit can be configured and in no way is to limit the amount of configurations.

The present configuration in FIG. 1 has the start switch 43 directly connected to the low force cylinder valve 44 and the control unit 40. It should be noted that the connection to the control unit 40 is not necessary in this configuration but could be advantageous to tell the control unit 40 that the press is in operation.

The operation of the ultrasonic press as disclosed in FIG. 1 is as follows. The operator of the press positions the first part 4 and second part 5 on top of one another on the anvil 6 in the desired positions. Once the parts are in position the operator activates the start switch 43, which would open the low force cylinder valve 44 actuating the low force cylinder 10, which safely lowers the head 2 and horn 3 assembly down onto the parts. Once the horn 3 is determined to be a safe distance to the parts, the magnetic proximity 41 sensor will detect the magnet 42 in the low force cylinder's piston 12. The sensor then sends a signal to the control unit 40 which open's the high force cylinder valve 45. Once the high force cylinder 20 is engaged the press would have the proper high force needed to complete the ultra sonic welding process. It should be noted that the low force cylinder 10 can continued to be pressurized during the welding process or once the high force cylinder 20 is pressurized the low force cylinder 10 can be unpressurized.

In this specific configuration the cylinders are transmitting their force directly to the head 2 through the drive rods 13 and therefore, the force created by each cylinder is transmitted directly to the parts 4, 5. One advantage of this configuration is being able to set up the press at a fixed high force ("HF") to low force ("LF") ratio ("HF:LF") of x:1. The Force ("F") exerted by a pressure cylinder can roughly be calculated to equal the Area ("A") of the cylinder's piston multiplied by the pressure ("p") used (F=p*A). Where A equals π multiplied by the respective cylinders piston diameter ("d") squared, divided by 4 (A=π*$d^2$/4). If the low force cylinder's 10 piston 12 diameter is DL and the high force cylinder's 20 piston diameter is DH then the HF:LF would be p*π*$DH^2$/4: p*π*$DL^2$/4. Simplifying the equation makes the HF:LF ratio equal to $DH^2$:$DL^2$ or $DH^2$/$DL^2$:1. The advantage of this is that the operator of the press will be able to easily determine how much force each cylinder is making at a given pressure. For instance if the HF:HL ratio is 10:1 and the operator needed a high force of two hundred pounds for a particular welding application he would in turn also know that the low force cylinder 10 is generating twenty pounds of force. Therefore, the operator would easily be able to change the machine for different welding applications and know if the low force cylinder 10 was in a safe operating range to prevent injuries. It should be noted that for this specific formula to be accurate the low force cylinder 10 is depressurized when the high force cylinder 20 is pressurized.

Figure 2:
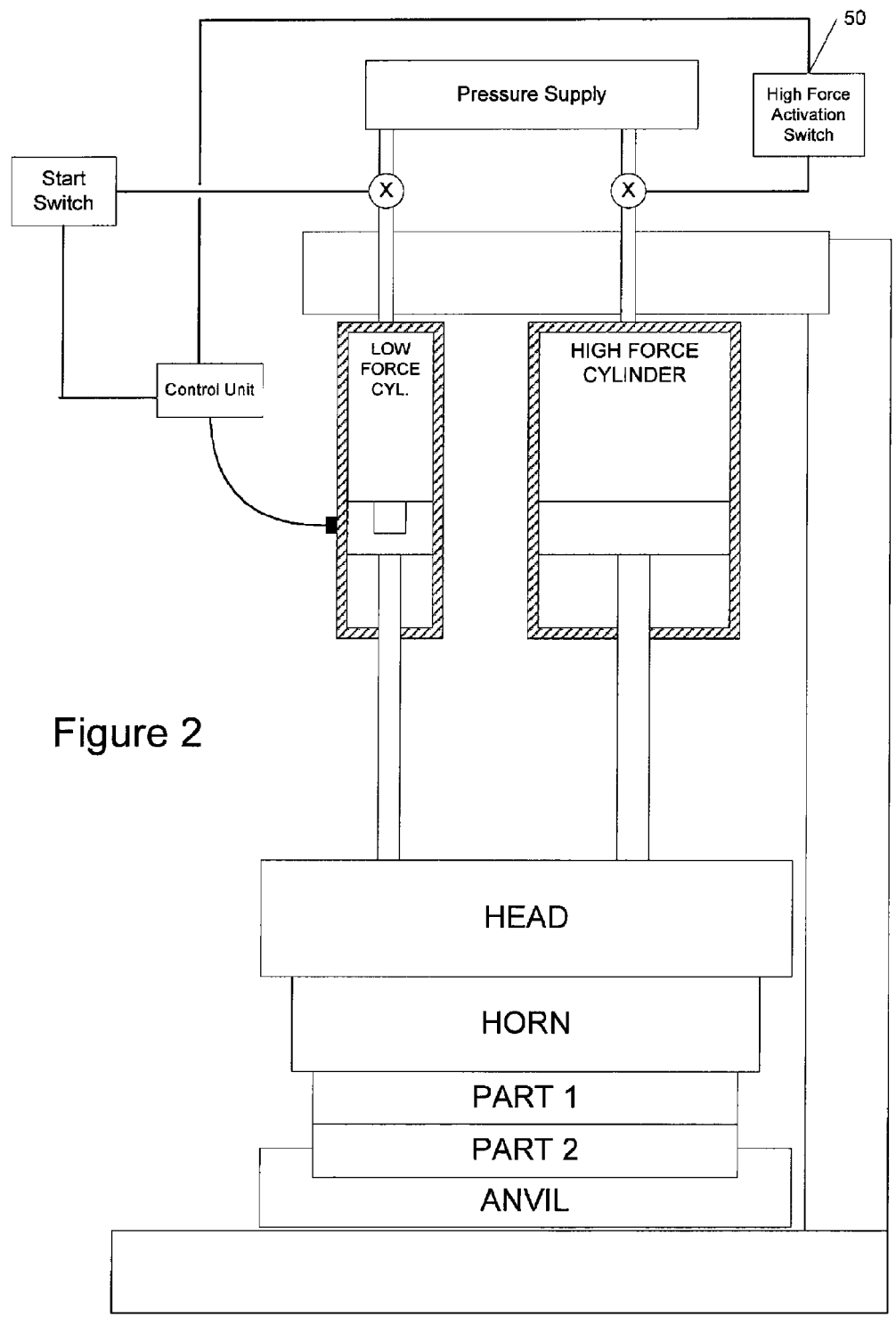
FIG. 2 is a schematic view of another embodiment of the present invention, which further incorporates a High Force Activation Switch.

FIG. 2 is similar to the embodiment of FIG. 1 except it incorporates a high force activation switch 50. The high force activation switch 50 adds several advantages in safety and usefulness to the present invention. One such advantage is that the full operation of the unit could require the user to hold down the start switch 43 and the high force activation switch 50 with separate hands. This would allow a user to lower the horn 3 onto the parts by depressing the start switch 43 with one hand and still have the second hand free to ensure the parts to be welded stay in the proper position. Once the head is holding the parts into place using the low force cylinder 10 the operator can then take his free hand and depress the high force activation switch 50 starting the welding process. By requiring the user to hold down both the start switch 43 and the high force activation switch 50 with separate hands this ensures that the high force cylinder 20 cannot be activated while the users hand is near the head 3 of the press.

Another advantage of the high force activation switch 50 is that it prevents the accidental start of the welding process if the parts are not in the proper alignment. This would happen if the machine was set up to automatically pressurize the high force cylinder 20 as soon as the control unit 40 received a signal from the sensor 41 that the head 2 or horn 3 of the unit was in a safe position. If the parts were not properly aligned under the head 3 but are in such a way that the head 3 is determined to be in a safe position, an injury could occur if, say, the parts were shot out of the press under the force because the head was not pressing flush. By having the high force activation switch 50 present, a user would be able to visually inspect the parts' placement under the head 3 before the high force cylinder 20 is pressurized.

The ultrasonic press can also be setup where the start switch 43 and high force activation switch 50 only control the cylinders and a third switch(not shown), which could possibly be in the form of a foot pedal, could be used to start the ultrasonic welding process once the high force cylinder 20 is engaged. These are just but a few ways in which the switches can be set up and in no way is to limit the way in which the press can be set up to operate.

Figure 3:
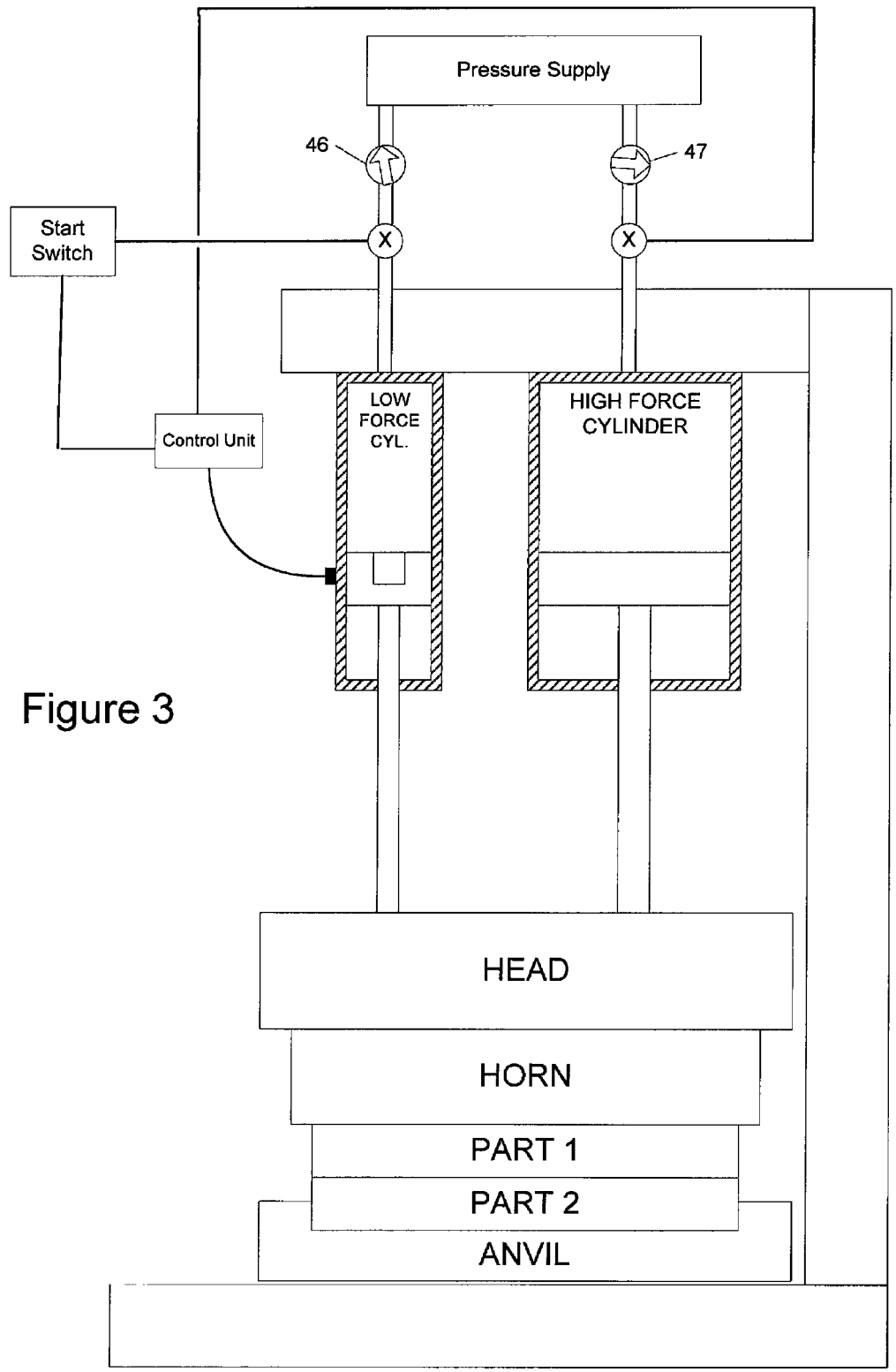
FIG. 3 is a schematic view of another embodiment of the present invention, which further incorporates an adjustable in-line pressure regulator on both the low force and high force actuators.

FIG. 3 is similar to the embodiment of FIG. 1 except it incorporates an in-line adjustable pressure regulator 46 on the low force cylinder 10 and an in-line adjustable pressure regulator 47 on the high force cylinder 20. This configuration adds several advantages in safety and usefulness to the present invention. One such advantage is that for the welding of some parts an operator may want to have the high force cylinder 20 generate less force so as to not damage the parts (1, 2) but at the same time have the low force cylinder 10 still operating at its maximum force to properly hold the parts (1,2) in place. Still yet another advantage of being able to adjust the force that each cylinder generates is that the operator would also be able to lower the force generated by the low force cylinder 10 so he would be able to more easily position the parts (1, 2) before the high force cylinder 20 was activated.

It is important to note that it is not necessary to have an in-line adjustable pressure regulator on both the high force cylinder 20 and the low force cylinder 10. For instance if the low force cylinder 10 is properly sized it will not generate enough force to harm the operator even when connected directly to the pressure supply 30. Therefore, one might only have an in-line adjustable pressure regulator 47 on the high force cylinder 20, since the low pressure cylinder 10 is not able to generate enough force to harm the operator even at the maximum pressure supplied by the pressure source 30. Furthermore, sizing the low force cylinder 10 so that it is unable to generate enough force at the maximum line pressure can be an important safety factor in preventing any accidental injuries caused by any accidental adjustments of the pressure supplied to the low force cylinder 10.

Figure 4:
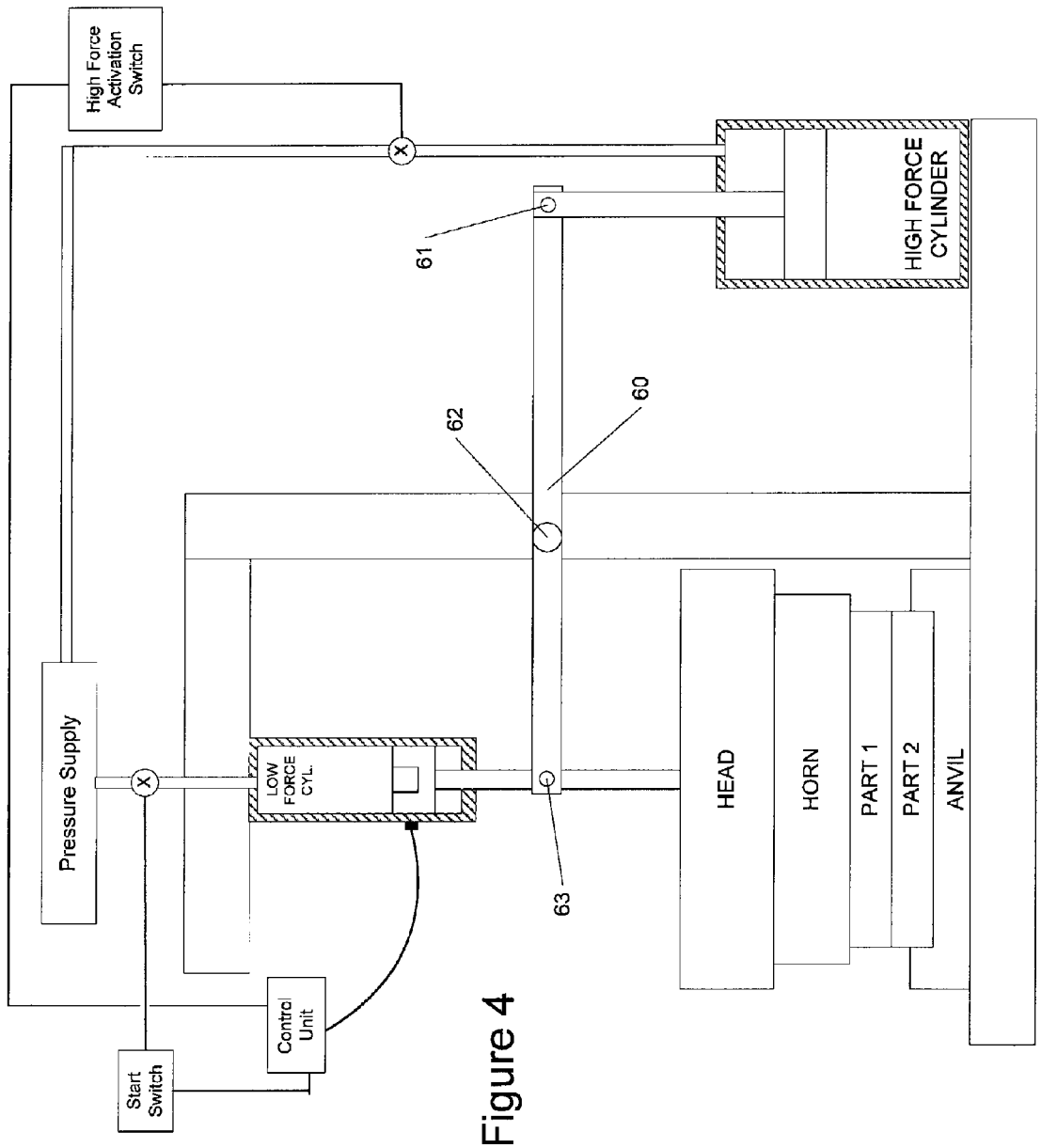
FIG. 4 is a schematic view of yet another embodiment of the present invention, which further incorporates a lever for mechanical advantage while generating high force.

FIG. 4 is similar to the previous two embodiments of the present invention; however, the high force cylinder 20 is moved to a position where it can also use mechanical advantage in applying force. In this embodiment the high force cylinder 20 is positioned behind the rear support 8 on the base 9. A lever 60 is connected at one end to the drive rod 13 of the high force cylinder 20 by a pin 61 and at the other end to the drive rod 13 of the low force cylinder 10 by a pin 62. The lever 60 is connected to the rear support 8 via a bearing 62. The bearing 62 should be in closer proximity to the drive rod 13 of the low force cylinder 10 in order to achieve the desired mechanical advantage.

One advantage of this particular embodiment is that both the low force and high force modes are transmitted through one centrally located drive rod 13 on the low force cylinder 10. The advantage of this is that the press is able to exert a centrally located uniform force across the whole horn 3, which in turn provides an even welding of the parts.

Another advantage of this embodiment is that a lower operating pressure can be used, yet the press will still be able to generate the high force necessary for the welding process. However, since the high force cylinder's 20 force will be multiplied through the use of the lever 60 and because the lever's 60 force amplification changes with its angle the HF:LF ratio as described above will no longer be applicable.

Variations from the described embodiments can be implemented by one skilled in the art without departing from the scope of the invention as set forth by the following claims.

What is claimed is:

1. A safety device for a press comprising:
a head for applying force;
a single fixed pressure source;
a low force pressure driven actuator for said head in communication with said single fixed pressure source, said low force pressure driven actuator comprising an axially moveable low force drive rod connected to said head, and said low force actuator converting pressure supplied by said single fixed pressure source into axial mechanical force applied to said head via said low force drive rod;
a high force pressure driven actuator for said head in communication with said single fixed pressure source, said high force pressure driven actuator comprising an axially moveable high force drive rod connected to said head, and said high force actuator converting pressure supplied by said single fixed pressure source into axial mechanical force applied to said head via said high force drive rod;
wherein said low force drive rod and said high force drive rod comprise separate elements moveable independently of one another;
wherein the operation of said head is limited to only with said low force actuator until said head is in a safe position, and when said head is determined to be in a safe position said high force actuator's use is permitted.

2. The device of claim 1, wherein the position of said head is determined by a sensor or switch.

3. The device of claim 1, wherein said pressure source is pneumatic.

4. The device of claim 1, wherein said pressure source is hydraulic.

5. The device of claim 1, wherein said low pressure actuator exerts less than 20 pounds of force.

6. The device of claim 1, wherein said high force actuator has mechanical advantage.

7. The device of claim 1, wherein the high to low force ratio is x:1, and $x=DH^2/DL^2$, where DH is a cylinder diameter of a high force cylinder of said high force actuator and DL is a cylinder diameter of a low force cylinder of said low force actuator.

8. The device of claim 1, wherein an adjustable pressure regulator is between the pressure source and at least one of the low force actuator and the high force actuator.

9. A safety device for a press comprising:
a head for applying force;
a single fixed pressure source;
a low force pressure driven actuator for said head in communication with said single fixed pressure source, said low force pressure driven actuator comprising an axially moveable low force drive rod connected to said head, and said low force actuator converting pressure supplied by said single fixed pressure source into axial mechanical force applied to said head via said low force drive rod;

a high force pressure driven actuator for said head in communication with said single fixed pressure source, said high force pressure driven actuator comprising an axially moveable high force drive rod connected to said head, and said high force actuator converting pressure supplied by said single fixed pressure source into axial mechanical force applied to said head via said high force drive rod;

wherein said low force drive rod and said high force drive rod comprise separate elements moveable independently of one another;

a sensor for detecting the position of said head;

wherein said sensor limits the operation of said head with only said low force actuator until said sensor determines said head to be in a safe position, and when said head is determined to be in a safe position said high force actuator's use is permitted.

10. The device of claim 9, wherein said pressure source is pneumatic.

11. The device of claim 9, wherein said pressure source is hydraulic.

12. The device of claim 9, wherein said low pressure actuator exerts less than 20 pounds of force.

13. The device of claim 9, wherein said high force actuator has mechanical advantage.

14. The device of claim 9, wherein the high to low force ratio is x:1, and $x=DH^2/DL^2$, where DH is a cylinder diameter of a high force cylinder of said high force actuator and DL is a cylinder diameter of a low force cylinder of said low force actuator.

15. The device of claim 9, wherein an adjustable pressure regulator is between the pressure source and at least one of the low force actuator and the high force actuator.

16. A safety device for a press comprising:

a head for applying force;

a low force pressure actuated cylinder for actuating said head, said low force pressure actuated cylinder comprising an axially moveable low force drive rod connected to said head;

a high force pressure actuated cylinder for actuating said head, said high force pressure actuated cylinder comprising an axially moveable high force drive rod connected to said head;

a single pressure source fixed at a predetermined pressure for actuating said low force cylinder and said high force cylinder;

wherein said low force pressure actuated cylinder converts pressure supplied by said single pressure source into axial mechanical force applied to said head via said low force drive rod;

wherein said high force pressure actuated cylinder converts pressure supplied by said single pressure source into axial mechanical force applied to said head via said high force drive rod;

wherein said low force drive rod and said high force drive rod comprise separate elements moveable independently of one another;

a sensor for detecting the position of said head;

wherein said sensor limits the operation of said head with only said low force cylinder until said sensor determines said head to be in a safe position, and when said head is determined to be in a safe position said high force cylinder's use is permitted.

17. The device of claim 16, wherein said pressure source is pneumatic.

18. The device of claim 16, wherein said pressure source is hydraulic.

19. The device of claim 16, wherein said low pressure actuator exerts less than 20 pounds of force.

20. The device of claim 16, wherein said high force actuator has mechanical advantage.

21. The device of claim 16, wherein the high to low force ratio is x:1, and $x=DH^2/DL^2$, where DH is the cylinder diameter of the high force cylinder and DL is the cylinder diameter of the low force cylinder.

22. The device of claim 16, wherein an adjustable pressure regulator is between the pressure source and at least one of the low force actuator and the high force actuator.

23. A safety device for a press comprising:

a head for applying force;

a single fixed pressure source;

a low force pressure driven actuator for said head in communication with said single fixed pressure source, said low force pressure driven actuator comprising an axially moveable low force drive rod connected to said head, and said low force actuator converting pressure supplied by said single fixed pressure source into axial mechanical force applied to said head via said low force drive rod;

a high force pressure driven actuator for said head in communication with said single fixed pressure source, said high force pressure driven actuator comprising an axially moveable high force drive rod connected to said head, and said high force actuator converting pressure supplied by said single fixed pressure source into axial mechanical force applied to said head via said high force drive rod;

wherein said low force drive rod and said high force drive rod comprise separate elements moveable independently of one another;

an adjustable pressure regulator between the pressure source and at least one of the low force actuator and the high force actuator;

wherein the operation of said head is limited to only with said low force actuator until said head is in a safe position, and when said head is determined to be in a safe position said high force actuator's use is permitted;

wherein the position of said head is determined by a sensor or switch; and wherein said high force actuator has mechanical advantage.

24. A safety device for a press comprising:

a head for applying force;

a single fixed pressure source;

a low force pressure driven actuator for said head in communication with said single fixed pressure source;

a high force pressure driven actuator for said head in communication with said single fixed pressure source;

wherein the operation of said head is limited to only with said low force actuator until said head is in a safe position, and when said head is determined to be in a safe position said high force actuator's use is permitted; and wherein the high to low force ratio is x:1, and $x=DH^2/DL^2$, where DH is a cylinder diameter of a high force cylinder of said high force actuator and DL is a cylinder diameter of a low force cylinder of said low force actuator.

25. A safety device for a press comprising:
a head for applying force;
a single fixed pressure source;
a low force pressure driven actuator for said head in communication with said single fixed pressure source;
a high force pressure driven actuator for said head in communication with said single fixed pressure source;
a sensor for detecting the position of said head;
wherein said sensor limits the operation of said head with only said low force actuator until said sensor determines said head to be in a safe position, and when said head is determined to be in a safe position said high force actuator's use is permitted; and
wherein the high to low force ratio is x:1, and $x=DH^2/DL^2$, where DH is a cylinder diameter of a high force cylinder of said high force actuator and DL is a cylinder diameter of a low force cylinder of said low force actuator.

26. A safety device for a press comprising:
a head for applying force;
a low force pressure actuated cylinder for actuating said head;
a high force pressure actuated cylinder for actuating said head;
a single pressure source fixed at a predetermined pressure for actuating said low force cylinder and said high force cylinder;
a sensor for detecting the position of said head;
wherein said sensor limits the operation of said head with only said low force cylinder until said sensor determines said head to be in a safe position, and when said head is determined to be in a safe position said high force cylinder's use is permitted; and
wherein the high to low force ratio is x:1, and $x=DH^2/DL^2$, where DH is the cylinder diameter of the high force cylinder and DL is the cylinder diameter of the low force cylinder.

* * * * *